June 14, 1932. J. I. PNEUMAN 1,862,580

GAME TRAP

Filed Sept. 21, 1926

INVENTOR
JAMES I. PNEUMAN
BY
ATTORNEY

Patented June 14, 1932

1,862,580

UNITED STATES PATENT OFFICE

JAMES I. PNEUMAN, OF ONEIDA, NEW YORK, ASSIGNOR TO TRIUMPH TRAP COMPANY, INC., OF NEW YORK, N. Y., A CORPORATION OF NEW YORK

GAME TRAP

Application filed September 21, 1928. Serial No. 307,360.

This invention relates to traps, more particularly to that type of traps adapted for catching fur-bearing animals.

One of the objects of the invention is to provide a trap of this character which may be set with greater facility than has obtained in traps of this character as hitherto constructed.

Another object of the invention is to provide a trap wherein an extremely delicate set may be obtained.

Another object of the invention is to provide a trap wherein the means employed to lock the trap in a set position will automatically move into locking position, when the trap is held in an upside down position.

Another object of the invention is to provide a trap of exceedingly simple construction, where the usual cross-arm construction, common to traps of this type, is entirely omitted, permitting the trap to be set in the narrow runways frequented by fur-bearing animals.

A further object of the invention is to provide a trap wherein the cost of manufacture is greatly minimized by the omission of the cross-arm construction usually employed to carry the pan and locking latch for the jaws of the trap.

Other objects and aims of the invention, more or less specific than those referred to above, will be in part obvious and in part pointed out in the course of the following description of the elements, combinations, arrangements of parts and application of principles, constituting the invention; and the scope of protection contemplated will be indicated in the appended claims.

Referring now to the drawing wherein similar reference characters refer to similar parts throughout the several views of the drawing, Figure 1 is a perspective view, illustrating my improved trap;

Figure 1:
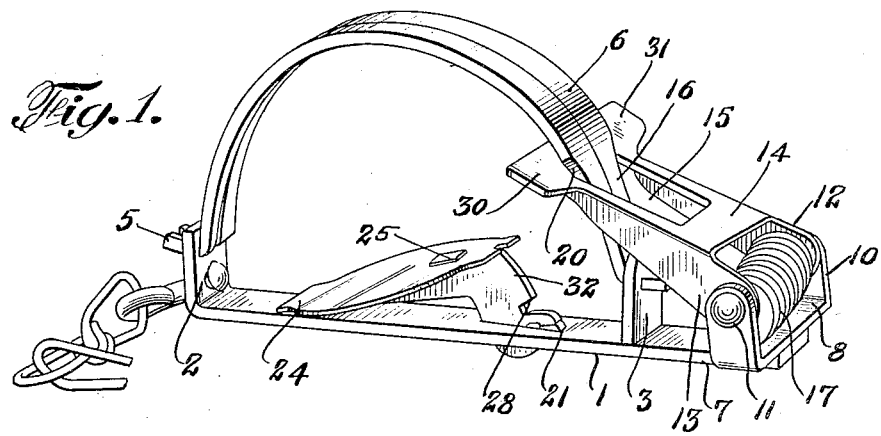

Referring now to the drawing wherein similar reference characters refer to similar parts throughout the several views thereof, the reference numeral 1 denotes the base plate or foundation of the trap, said base plate comprising a strip of metal having an upstanding lug or flange 2 at one end and another upstanding lug or flange 3, which is riveted as at 4, or otherwise fastened on the base plate 1, adjacent the end of the base plate opposite the lug or flange 2. The lugs 2 and 3 are apertured to receive the pintles 5 of the jaws 6, as is usual in trap construction.

The base plate 1 is provided with an end extension 7, upon which is mounted a yoke 8 fastened thereon as by riveting, shown at 9, or otherwise. This yoke is provided with the upstanding ears 10, through which extends a pin 11, adapted to form a pivotal support for the ears 12 and 13 of an actuating lever 14. This actuating lever, which is preferably formed of a strip of sheet metal, bent into the form clearly shown in Figure 1 of the drawing, is provided with an elongated aperture 15, through which extends the shanks or legs 16 of the jaws 6.

Lever 14 is actuated as by means of a coil spring 17, one end of which 18 engages with the base plate and the opposite end 19 engaging with the actuating lever normally urges the latter to a swinging movement in an upward direction, the upward movement of the actuating lever being limited, as by means of shoulders 20 formed on the jaws. It will be obvious, of course, that when the actuating lever is swung to its uppermost position, as shown in Figure 1, the jaws 6 will have been moved to their closed positions.

The base plate 1 intermediate the lugs 2 and 3 is provided with an elongated lengthwise extending slot 21 and extending across this slot is a bar 22, which bar is preferably formed by a strip of metal integrally formed with the base plate, the slot 21 having been formed by striking metal from the base plate, leaving the cross-arm 22 remaining. This bar forms a pivotal support for the shank 23 and the pan 24, the shank and pan being united by riveting a part of the shank thereto, as indicated at 25.

The pan shank 23 is as preferable slit as at 26, whereby by opening said slit the shank may be positioned about the bar, whereupon the slit may be closed by bending the metal. This forms a convenient and economical method of mounting the pan shank on the base plate.

Figure 2:
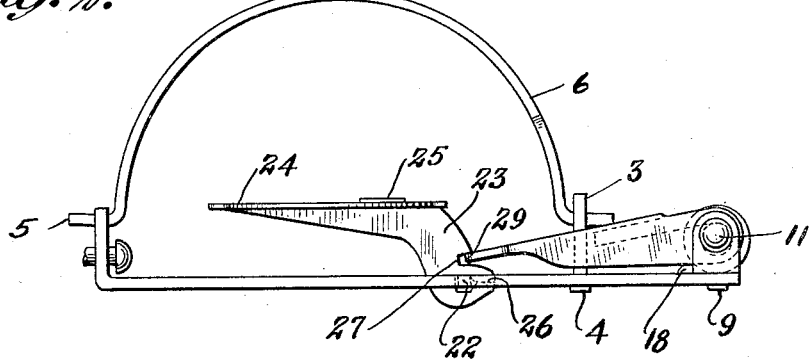
Figure 2 is a side elevational view thereof, showing the actuating lever in locked position, the jaws of the trap, however, being shown in their normally closed positions.
Figure 3:
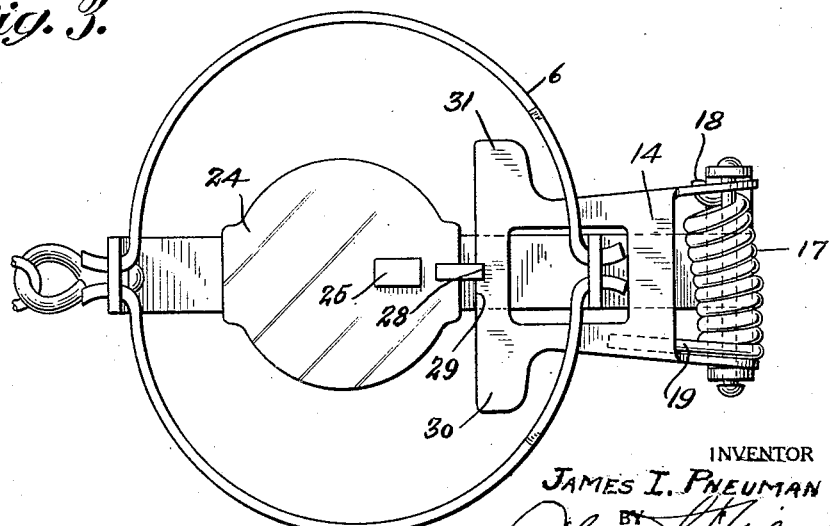
Figure 3 is a top plan view of the trap showing the latter in set position.

Pan shank 23 is preferably provided with a slot 27, forming a shoulder 28 adapted to engage with the end 29 of the actuating lever 14, when the latter is moved to the position shown in Figures 2 and 3 of the drawing.

By reference to Figures 1 and 2 it will be noted that the weight of the pan and shank is located to one side of its pivotal support, so that normally the pan will lie in the position shown in Figure 1.

The actuating lever 14 is preferably provided with the lateral extending thumb pieces 30 and 31.

The pan shank 23 is provided with the slightly curved surface 32, located between shoulder 28 and the pan 24, the purpose of which will be presently explained.

Having thus described the construction of this embodiment of my invention, the operation thereof, which should be largely understood, is as follows:

This trap can be set by the trapper pressing his thumbs against the thumb pieces 30 and 31, and forcing the lever 14 downwardly, whereupon the pan 24 may be lifted to carry the shoulder 28 over the end 29 of the lever, as indicated in Figure 2. The jaws 6 will then fall by gravity to the open positions indicated in Figure 3.

The trap may also be set by inverting it or turning it upside down and then depressing the lever whereby its end 29 will engage with the curved surface 32 of the pan shank and lift the pan until the end of the lever reaches the slot 27, whereupon by relieving the pressure on the lever it will engage with the shoulder 28, the latter holding the lever in its depressed position. When the trap is placed in its right side up position, the jaws will fall to their open positions.

It will be noted that this trap being devoid of the usual lateral extension of the cross-arm may be set in narrow runways, and inasmuch as neither of the jaws is locked but merely fall to their open positions by gravity, said jaws will accommodate themselves to the unevenness of the terrane immediately under or surrounding the place of the setting.

It will accordingly be seen that I have provided a construction well adapted, among others, to attain all the ends and objects above set forth in a very simple manner, and that I have provided a trap which while efficient in operation and easy of manipulation may nevertheless be manufactured at a modicum of cost.

As many changes could be made in this construction without departing from the scope of the following claims, it is intended that all matters contained in the above description or shown in the accompanying drawings shall be interpreted as illustrative only and not in a limiting sense.

Having thus described my invention, what I claim as new and desire to obtain by Letters Patent, is:

1. In a game trap, in combination, a base plate, a pair of cooperating jaws mounted upon the base plate, a jaw-closing lever pivotally mounted on the base plate, a spring for operating said lever, a pan having a shank mounted on the base plate, and said shank having means for engaging the jaw closing lever and holding the latter locked against the tension of its spring.

2. In a game trap, in combination, a base plate having mounted thereon a pair of cooperating jaws, a lever for actuating said jaws pivotalyy mouned upon the base plate, a spring for actuating said lever interposed between the base plate and the lever, a pan having a shank pivotally mounted upon the base plate and having a notch provided with a shoulder to engage the end of the actuating lever when the latter is moved into proximity with the base plate, whereby the lever is held in set position and the jaws are free to move by gravity to their set position, said pan falling by gravity when the trap is inverted, whereby the end of the actuating lever will be engaged with the shoulder of said slot.

3. In a game trap, in combination, a base plate having a pair of spaced, upstanding lugs, a pair of jaws, each jaw being provided with a pair of pintles which are pivotally mounted in said lugs, said base plate having a part extending beyond one of said lugs, an actuating lever for the jaws mounted upon said extension, a spring for actuating said lever, said base plate being provided with a notch located within the enclosure formed by the jaws, a pan having a shank located in said slot, said shank being provided with an aperture to receive a bar or piece extending across said slot, and said shank being provided with a slot having a shoulder to engage with the end of said actuating lever when the latter is swung into proximity with the base plate whereby the end of the lever will engage with the shoulder of said slot, to hold the lever in its depressed position.

4. In a trap of the class described, in combination, a base plate provided with upstanding ears, jaws having their pintles pivotally mounted in said ears, a spring actuated lever mounted upon an extension of the base plate to close said jaws, a pan mounted upon a shank pivotally mounted on the base plate, within the enclosure formed by the jaws, and means provided upon said shank to engage with and hold the actuating lever in a depressed position, and said means automatically engaging with said actuating lever when the trap is inverted and the actuating lever moved to its depressed position.

In witness whereof I hereunto affix my signature.

JAMES IRWIN PNEUMAN.